United States Patent [19]
Cole

[11] 3,805,501
[45] Apr. 23, 1974

[54] HEDGE TRIMMER CARRIAGE
[76] Inventor: Donald G. Cole, P.O. Box 1528, E. Broadmoor, Springfield, Mo. 65804
[22] Filed: May 8, 1970
[21] Appl. No.: 35,605

[52] U.S. Cl. ............................................. 56/237
[51] Int. Cl. ........................................ A01d 55/00
[58] Field of Search............. 56/17.6, 233, 234–237

[56] References Cited
UNITED STATES PATENTS
2,762,186 9/1956 Janata................................... 56/233
1,839,009 12/1931 Bankson .............................. 56/237

OTHER PUBLICATIONS
A. E. Shaw, An Electrically Driven Hedge Trimmer, Popular Mechanics, Oct. 1923, p. 635.

Primary Examiner—Robert Peshock
Assistant Examiner—J. A. Oliff
Attorney, Agent, or Firm—Koenig, Senniger, Powers and Leavitt

[57] ABSTRACT

A wheeled hedge trimmer carriage having a clamp for clamping a hand-held electric hedge trimmer by its handle with the trimmer on either side of the carriage and with provision for adjusting the trimmer up and down, in and out, and angularly, so that by rolling the carriage alongside a hedge with the trimmer suitably adjusted, the hedge may be trimmed in any desired manner.

3 Claims, 5 Drawing Figures

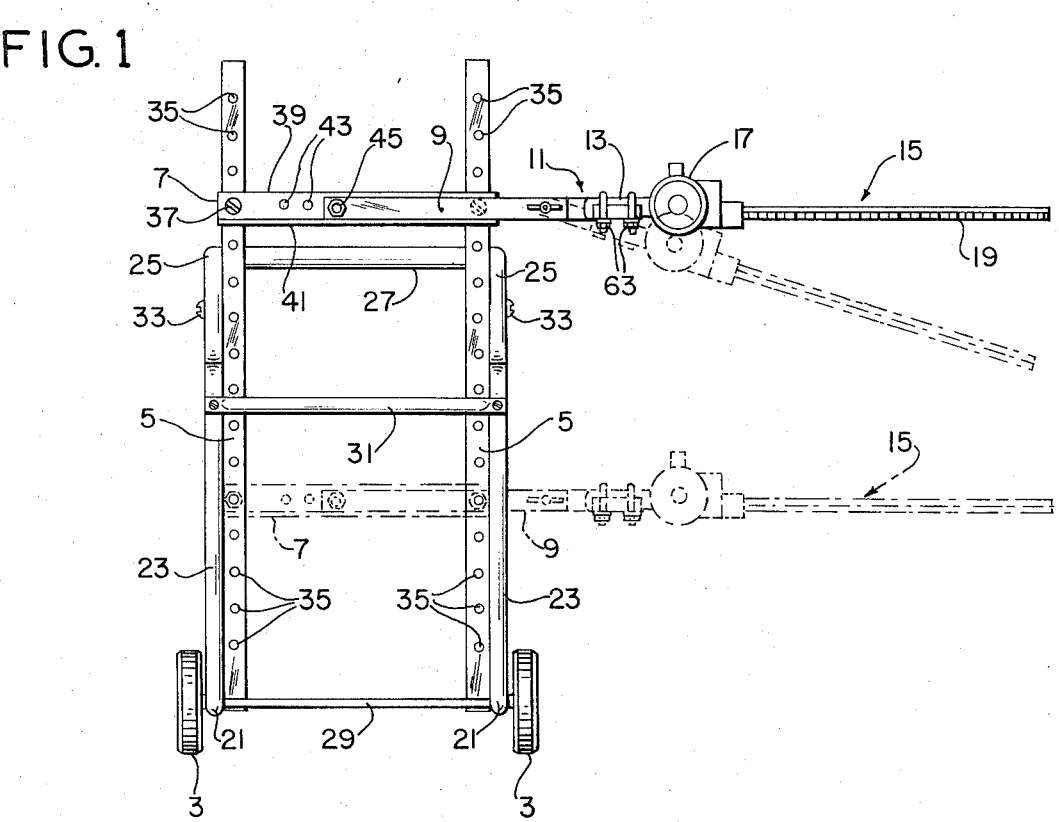
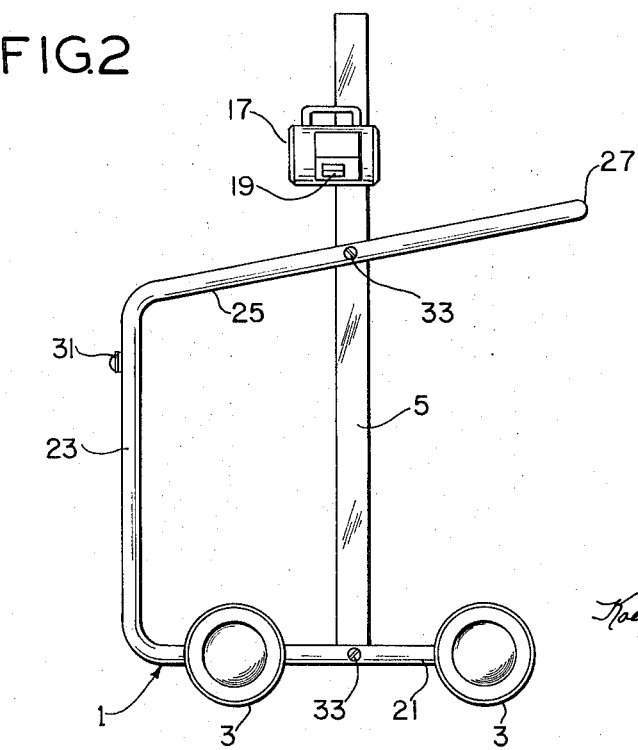

HEDGE TRIMMER CARRIAGE

BACKGROUND OF THE INVENTION

This invention relates to a hedge trimmer carriage, and more particularly to a carriage for a hand-held electric hedge trimmer.

The invention is specifically concerned with a wheeled carriage for a hand-held electric hedge trimmer adapted to be wheeled along the ground with the hedge trimmer in operation for trimming hedges. Reference may be made to such prior U.S. Pat. Nos. as 1,811,463, 1,930,934 and 2,762,186 for hedge trimmers on wheeled carriages, and particularly to Pat. No. 2,762,186 on which my invention is an improvement.

SUMMARY OF THE INVENTION

My invention has for its purpose the provision of a wheeled carriage on which a conventional commercially available hand-held electric-motor-operated hedge trimmer may be easily and conveniently mounted extending from either side of the carriage and adjusted to any requisite position for wheeling the carriage over the ground alongside a hedge for trimming the hedge. In general, a hedge trimmer carriage made in accordance with my invention comprises a chassis having wheels at the sides thereof for being rolled over the ground and a pair of uprights extending upwardly from the chassis at opposite sides thereof. A crossbar extends generally horizontally between the uprights and is adapted for adjustment on the uprights to different vertical positions relative thereto, with the crossbar horizontal in any adjusted position. An arm is carried by said crossbar extending endwise thereof, with this arm being adapted to extend outwardly beyond either end of said crossbar, and being adjustable in and out endwise of the crossbar and hence laterally of the carriage. Means is provided for clamping the handle of a hand-held electric hedge trimmer, this means being pivoted at the outer end of the arm for swinging adjustment about a horizontal axis extending longitudinally in respect to the carriage. Other objects and features will be in part apparent and in part pointed out hereinafter.

BRIEF DESCRIPTION OF THE DRAWINGS

FIG. 1 is a front elevation of a hedge trimmer carriage of this invention;

FIG. 2 is a side elevation of FIG. 1;

Corresponding reference characters indicate corresponding parts throughout the several views of the drawings.

DESCRIPTION OF THE PREFERRED EMBODIMENT

Figure 3:
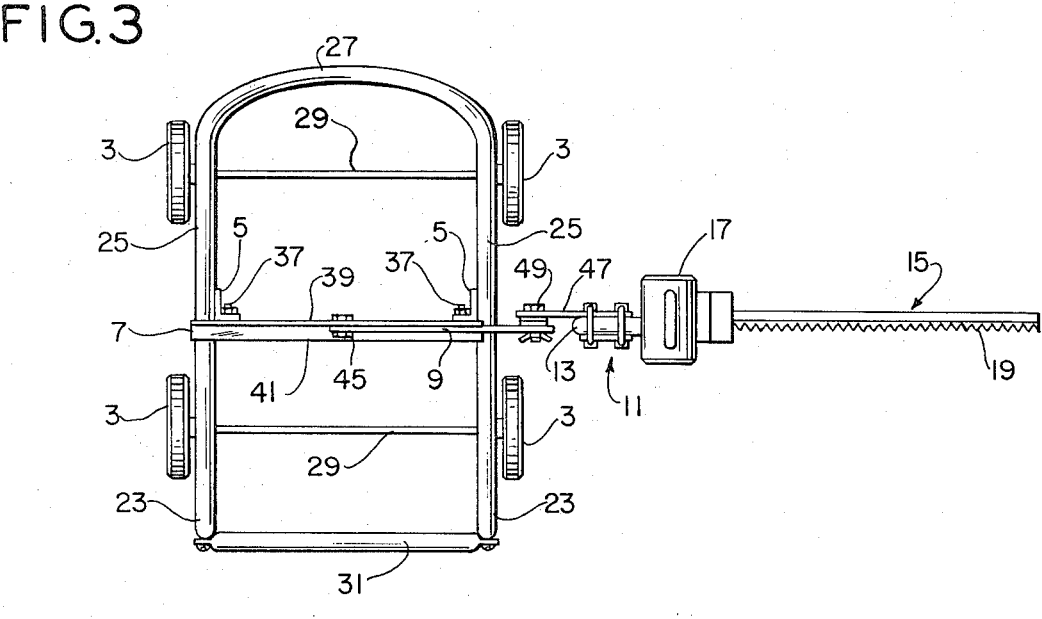
FIG. 3 is a plan of FIG. 1.

Referring to the drawings, a hedge trimmer carriage of this invention is shown to comprise a chassis generally designated 1 having wheels 3 at the sides thereof for being rolled over the ground. Extending upwardly from the chassis at opposite sides thereof are two uprights, each designated 5. A crossbar 7 extends generally horizontally between the uprights 5, being adapted for adjustment on the uprights to different vertical positions relative thereto, with the crossbar horizontal in any adjusted position. FIG. 1 shows the crossbar in a relatively high position in solid lines, and in a relatively low position in dotted lines. An arm 9 carried by the crossbar extends laterally outward therefrom beyond one end (the right end as shown in FIG. 1) of the crossbar. This arm is adapted to extend laterally outward on either side of the carriage and is adjustable laterally in and out lengthwise of the crossbar, as will appear. Means indicated generally at 11 for clamping the handle 13 of a conventional hand-held electric hedge trimmer 15 is pivotally mounted at the outer end of arm 9 for swinging adjustment about a horizontal axis extending longitudinally in respect to the carriage. The electric motor of trimmer 15 is indicated at 17 and the cutter bars of the trimmer at 19.

The chassis 1 comprises a pair of side frames each having a lower horizontal side member 21 with a front member 23 integral with the lower member bent to extend upward from the lower member at one end thereof (which may be referred to as the front end), an upper side member 25 (which may be inclined upward from front to rear as shown in FIG. 2) extending back from the upper end of member 23, with a cross-member 27 extending between the free rear ends of the upper members 25. This cross-member 27 forms a handle for pushing the carriage. The chassis 1 may be conveniently and economically formed from a length of pipe stock, first bent to U-shape to form the handle 27, and again bent to U-shape forming members 21, 23 and 25. The wheels 3 are mounted on the ends of axles 29 extending through holes in the lower side members 21. A front brace extending between members 23 is indicated at 31.

The uprights 5 extend up on the inside of the lower and upper members 21 and 25 and are suitably secured thereto as indicated at 33. Each upright is formed with a vertical series of bolt holes such as indicated at 35 for receiving bolts 37 for holding the crossbar 7 in at various positions of vertical adjustment. The crossbar 7, as shown, consists of an angle iron having a vertical leg 39 attached by the bolts 37 to the uprights 5 and a horizontal leg 41. The vertical leg 39 has a horizontal series of holes 43 for receiving a bolt 45 for bolting the inner end of arm 9 to the leg 39 at a number of adjusted positions, with the arm 9 bearing on the horizontal leg 41, and adapted to extend outward on either side of the carriage.

Figure 4:
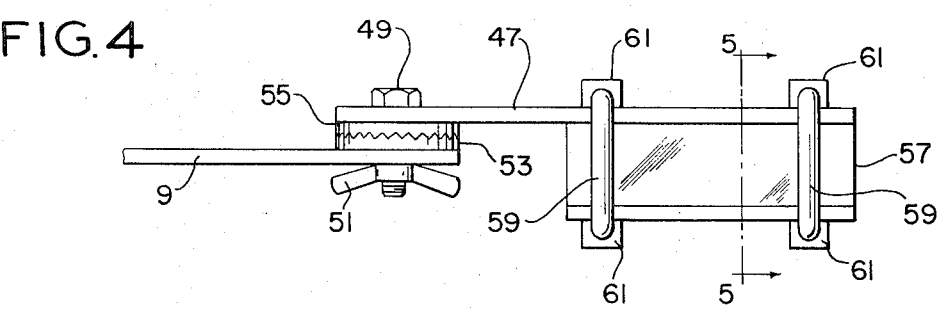
FIG. 4 is an enlarged detail view.
Figure 5:
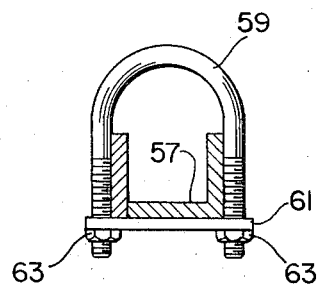
FIG. 5 is a section on line 5—5 of FIG. 4.

The clamping means 11 (see particularly FIGS. 4 and 5) comprises a bar 47 pivoted at one end by means of a bolt 49 at the outer end of arm 9 with a wing nut 51 threaded on the bolt. Arm 9 has a castellated member 53 secured thereon engageable by a castellated member 55 on the bar 47 to lock the latter in its angular adjusted position when the wing nut is tightened. The bar has an upwardly opening channel 57 toward its free outer end adapted to receive the handle 13 of the hedge trimmer 15. A pair of U-bolts 59 (inverted) straddle the channel and have their legs received in holes in lug members 61 extending laterally outward from the base of the channel, with bolts 63 threaded on their lower ends.

With the handle 13 of trimmer 15 clamped in the channel by the U-bolts, the trimmer may be adjusted up or down by adjustment of crossbar 7 up or down, in or out by adjustment of arm 9 in or out, and angularly up or down about the axis of bolt 49 for rolling the carriage along the ground alongside a hedge to trim the top and sides of the hedge. The vertical adjustment takes care of trimming hedges of different heights. The angular adjustment in conjunction with the lateral adjustment takes care of trimming vertical sides or beveled sides, or trimming the top of a hedge level when the ground alongside slopes down toward or down away from the hedge. Thus, for example, the trimmer may be set at an angle as shown in dotted lines at the top of FIG. 1 to trim the top of a hedge level where the ground slopes away from the hedge (in such case the wheels are on the incline and the trimmer is level). The trimmer may be angularly adjusted to extend vertically for vertical side trimming or off vertical for off vertical side trimming. It will also be observed that the trimmer may be carried on either side of the carriage by positioning arm 9 to extend outward on either side of the carriage.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A hedge trimmer carriage comprising a pair of side frames each formed of tubular stock bent to have a lower generally horizontal member, a front member integral with the lower member bent to extend generally vertically upward from the lower member at one end thereof constituting its front end, and an upper member integral with the front member bent to extend back from the upper end of the front member above the lower member, a handle extending between the rearward ends of said upper members of the side frames, a pair of axles extending between said lower members of the side frames, one adjacent the front ends and the other adjacent the rear ends of said lower members, wheels on the ends of the axles, a pair of uprights carried by the side frames, each of said uprights being secured at its lower end to a respective lower side frame member at a point between the axles and being secured adjacent its upper end to a respective upper side frame member at a point between the ends thereof, said uprights extending above the upper side frame members, a crossbar extending generally horizontally between said uprights, means for securing the crossbar to the uprights enabling adjustment of the crossbar to different vertical positions relative thereto with the crossbar horizontal in any adjusted position, an arm carried by said crossbar extending endwise thereof adapted to extend outwardly beyond either end of said crossbar, said arm being adjustable in and out endwise of the crossbar and hence laterally of the carriage, means for securing said arm in a first mode extending outwardly beyond one end of said crossbar and in a second mode extending outwardly beyond the other end of said crossbar and in various positions of endwise adjustment in either mode, and means pivoted at the outer end of said arm on a horizontal axis extending longitudinally in respect to the carriage for clamping the handle of a hand-held electric hedge trimmer and holding the trimmer for swinging adjustment about said horizontal axis.

2. A hedge trimmer carriage as set forth in claim 1 wherein the crossbar comprises an angle iron having a vertical leg attached to the uprights and a horizontal leg, said securing means comprising bolts receivable in a horizontal series of holes in said vertical leg for bolting the inner end of said arm thereto at a number of adjusted positions in either mode, said arm bearing on the horizontal leg of the crossbar.

3. A hedge trimmer as set forth in claim 2 wherein said handle clamping means comprises a bar carrying a pair of U-bolts for clamping the handle thereto, said bar being pivoted at the outer end of said arm on said axis, and wherein means is provided for locking said bar in any position of angular adjustment thereof about said horizontal axis.

* * * * *